(12) United States Patent
Franchitti et al.

(10) Patent No.: US 11,381,096 B2
(45) Date of Patent: Jul. 5, 2022

(54) POWER MANAGEMENT SCHEME FOR VIBRATION HARVESTER SENSOR

(71) Applicant: Aktiebolaget SKF

(72) Inventors: Julian Franchitti, Biggar (GB); Mark Rhodes, RG South Queensferry (GB)

(73) Assignee: Aktiebolaget SKF, Gothenburg (SE)

( * ) Notice: Subject to any disclaimer, the term of this patent is extended or adjusted under 35 U.S.C. 154(b) by 409 days.

(21) Appl. No.: 16/679,863

(22) Filed: Nov. 11, 2019

(65) Prior Publication Data

US 2021/0143659 A1 May 13, 2021

(51) Int. Cl.
| | |
|---|---|
| *H02J 7/00* | (2006.01) |
| *H02J 50/00* | (2016.01) |
| *G01P 15/00* | (2006.01) |
| *G01M 17/08* | (2006.01) |
| *B61K 9/00* | (2006.01) |
| *G01H 17/00* | (2006.01) |
| *B61L 27/40* | (2022.01) |

(52) U.S. Cl.
CPC ............ *H02J 7/00306* (2020.01); *B61K 9/00* (2013.01); *B61L 27/40* (2022.01); *G01H 17/00* (2013.01); *G01M 17/08* (2013.01); *G01P 15/00* (2013.01); *H02J 7/0063* (2013.01); *H02J 50/001* (2020.01)

(58) Field of Classification Search
CPC .............. H02J 7/00306; H02J 7/00308; H02J 7/00309; H02J 7/0048; H02J 7/00304; H02J 7/00302; H02J 7/0029; H02J 50/001; G01P 15/00; G01M 17/08; G01M 17/00; B61L 27/40; B61K 9/00
See application file for complete search history.

(56) References Cited

U.S. PATENT DOCUMENTS

| | | | |
|---|---|---|---|
| 2014/0361738 A1* | 12/2014 | Lee ...................... | H02J 50/80 320/108 |
| 2015/0042267 A1* | 2/2015 | Wang ................... | H02J 50/10 320/108 |
| 2020/0083722 A1* | 3/2020 | Zhang .................. | H02J 7/0021 |

* cited by examiner

*Primary Examiner* — Nguyen Tran
(74) *Attorney, Agent, or Firm* — Garcia-Zamor Intellectual Property Law; Ruy Garcia-Zamor; Bryan Peckjian (57) ABSTRACT

A system for managing sensor power to a remote wireless condition monitoring sensor installed on a railway rolling stock. The system provides an energy harvester that derives wireless sensor power, a rechargeable battery connected to the energy harvester for supplying energy to the rechargeable battery and for powering the system, an antenna for sending signals to a remote database based on measured vibration and acceleration data, a central processing unit having a memory an arithmetic logic unit and a control unit for controlling a function of the system. The remote wireless condition monitoring sensor is protected from potentially fatal over voltage and under voltage conditions and the operating life is prolonged by entering dedicated modes of operation based on battery voltage and available energy capacity as instructed by the central processing unit. Also, a method for carrying out the function of the system.

10 Claims, 6 Drawing Sheets

POWER MANAGEMENT SCHEME FOR VIBRATION HARVESTER SENSOR

TECHNICAL FILED

This invention relates to a remote wireless condition monitoring sensor installed on a railway rolling stock. The wireless sensor power is derived from an energy harvester supplying energy into a rechargeable battery. The invention specifically concerns protecting the sensor and prolonging the operating life by entering dedicated modes of operation based on the battery voltage and available energy capacity.

BACKGROUND OF THE INVENTION

Typically, railway rolling stock to which remote condition monitoring devices can be attached, go through several maintenance events and refurbishments during their lifetime. In this scenario, no power is harvested as the equipment is stationary and the sensor device constantly drains power from the internal rechargeable battery.

In the case of some lithium re-chargeable batteries, irreversible damage can be incurred if the battery is discharged below a certain level. Also, if the battery is depleted, the remote condition monitoring device may be unable to recover as it requires energy for the power electronics to operate to enable energy to be extracted from the harvester. This is a typical scenario that harvesting enabled technology requires some level of stored power to enable harvesting to take place.

Typically, energy harvesting technology is installed on equipment which is constantly moving and doesn't spend significant time without an energy stimulus. The rail environment is a unique example where due to refurbishment of components the device could be inactive for months at a time. Additionally, if a wheel set is scrapped the sensor may be removed and left unattached for extended periods.

Existing remote condition monitoring systems in most cases include wired power and therefore do not suffer from this issue. These systems are expensive to purchase and install and are not practical for fitting on fleets of trains.

Other solutions include sensors with integrated primary batteries which can operate until the batteries are depleted in which case they must undergo a maintenance procedure to replace the depleted cells or replace the device itself both of which incur significant costs. The advantage of the proposed invention over battery solutions is that the system hardware is fully recoverable and can operate indefinitely.

As is the case with the present invention, implementing an intelligent power management scheme within the sensor to handle such events is essential to ensure the product isn't damaged or fails to recover from prolonged periods where no power has been generated and stored.

SUMMARY OF THE INVENTION

According to a first aspect, exemplary embodiments relate to a system for managing sensor power to a remote wireless condition monitoring sensor installed on a railway rolling stock. The system includes an energy harvester that derives wireless sensor power, a rechargeable battery connected to the energy harvester for supplying energy to the rechargeable battery and for powering the system, an antenna for sending signals to a remote database based on measured vibration and acceleration data, a central processing unit having a memory an arithmetic logic unit and a control unit for controlling a function of the system. The remote wireless condition monitoring sensor is protected from potentially fatal over voltage and under voltage conditions and the operating life is prolonged by entering dedicated modes of operation based on battery voltage and available energy capacity as instructed by the central processing unit, energy capacity thresholds for the rechargeable battery are configured in the memory, and an available energy capacity is calculated by the arithmetic logic unit based on a measured voltage and temperature of the rechargeable battery. The remote condition monitoring device is configured with at least five different power modes that are enterable based on the calculated available energy capacity of the internal rechargeable battery and/or specific events detailed. Irreversible damage is avoided by insuring that the battery is not discharged below a threshold level.

In a second aspect of the above referenced embodiment the energy harvester is one of an electromagnetic, a piezoelectric, and a thermal energy harvester.

In another aspect a method of managing sensor power to a remote wireless condition monitoring sensor installed on a railway rolling stock provides deriving wireless sensor power from an energy harvester supplying energy into a rechargeable battery, protecting the remote wireless condition monitoring sensor from potentially fatal over voltage and under voltage conditions and prolonging the operating life by entering dedicated modes of operation based on battery voltage and available energy capacity before damage occurs to the rechargeable battery, configuring the system with energy capacity thresholds for the rechargeable battery, and establishing an available energy capacity based on a measured voltage and temperature of the rechargeable battery. Incurring irreversible damage to the battery occurs if the battery is discharged below a critical level. If the battery is irreversibly damaged, the remote condition monitoring device will be unable to recover.

In a further aspect the method provides configuring the remote condition monitoring device with at least five different power modes that are enterable based on a calculated available energy capacity of the internal rechargeable battery and/or specific events detailed.

In a further aspect the method provides configuring the remote wireless condition monitoring sensor under a normal power mode of operation. Performing pre-defined tasks in the normal power mode of operation by the remote wireless conditioning monitoring sensor enables the sensor to capture measurements, harvest power, upload data, measure the voltage and temperature of the battery. Operating in the normal mode of operation by the remote condition monitoring sensor is continued if the calculated available energy is greater than or equal to a normal operating mode threshold limit.

In a further aspect the method provides configuring the remote wireless condition monitoring sensor under a low power mode of operation, detecting that the calculated available capacity is under a limit previously calculated configures the remote wireless condition monitoring sensor in the low power mode of operation. Reverting to the low power mode of operation reduces the operating schedule to conserve energy where measurements and data uploads are restricted to be performed less frequently by the remote wireless condition monitoring sensor.

In a further aspect the method provides configuring the remote wireless condition monitoring sensor in a critical mode of operation. Detecting that the energy available has breached a threshold and if no action is taken irreversible damage to the sensor occurs. Entering the critical mode of operation is based on no energy being harvested for a significant period of time. Deactivating power to all but a single circuit used solely to allow the sensor to be stored in an inactive state for prolonged periods and later recovered as a means of protection is instructed by the sensor, and reverting to a deep power down mode where only user intervention can re-initialise the device is instructed by the sensor. Enabling the sensor to survive for years is provided before reinitialising operation once again.

In a further aspect the method provides configuring the remote wireless condition monitoring sensor in a critical charge mode of operation. After re-initialising the sensor, the energy available is still at a critical level. Exiting the critical mode is carried out by the sensor first harvesting power and then entering a mode of operation where only power is supplied to the harvesting power management circuit. Enabling configuration of the critical charge mode is provided until the energy capacity has been charged to a minimum threshold level. Reverting to the critical mode is provided if the sensor fails to harvest power within a defined period of time.

In a further aspect the method provides configuring the remote wireless condition monitoring sensor in a critical temperature mode of operation. Reverting immediately to a critical temperature mode is provided if the sensor measures an extreme low temperature below a pre-defined threshold while in the normal operation or low power mode. At very low temperatures the capacity of the battery is low and insufficient for certain functions to be executed. In this mode, the sensor decreases its power usage from the battery even further and restricts measurements, data uploads and may also restrict harvesting. The sensor is scheduled to wake at pre-defined intervals to check the temperature to see if it can exit the critical temperature mode.

In a final aspect the method includes the harvester being one of an electromagnetic energy harvester, a piezoelectric harvester, and a thermal energy harvester.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
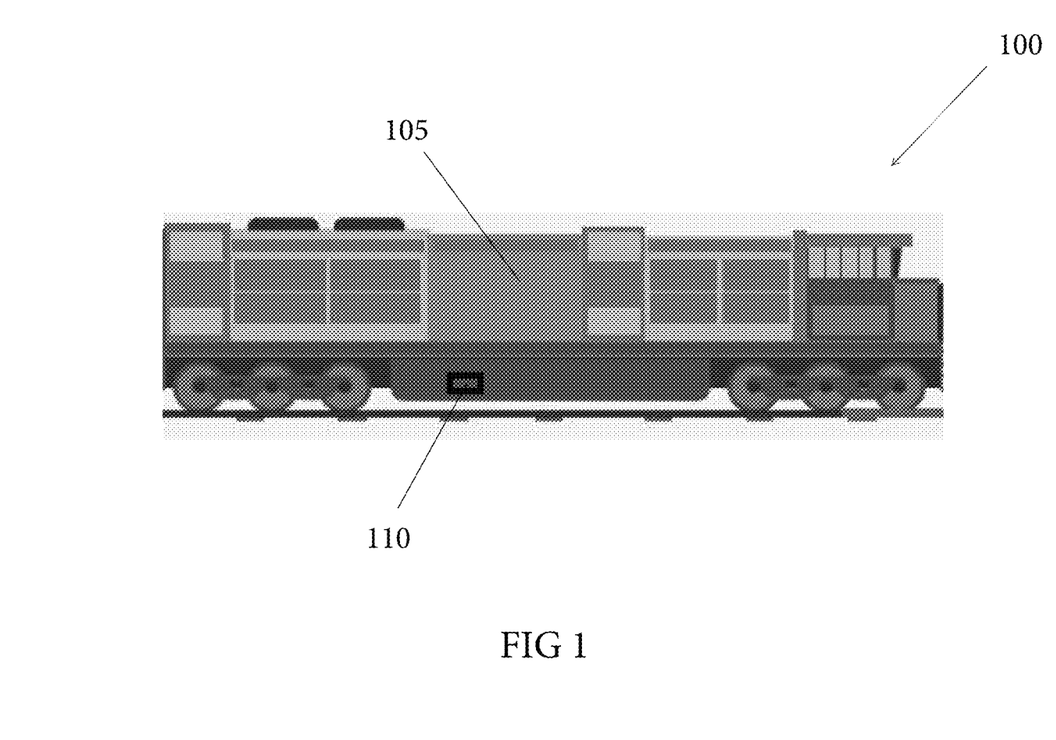
FIG. 1 is a side plan view of an arrangement including a train and a system for managing sensor power to a remote wireless condition monitoring sensor according to an embodiment of the present invention.

For purposes of description herein, the terms "inward," "outward," "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Arrangement and System

There is an arrangement 100 between a system 110 and a railway rolling stock 105 that is illustrated in FIG. 1. The system 110 is installed onto the railway rolling stock 105. The system 110 of the present invention is for managing sensor power to a remote wireless condition monitoring sensor 20.

Figure 2:
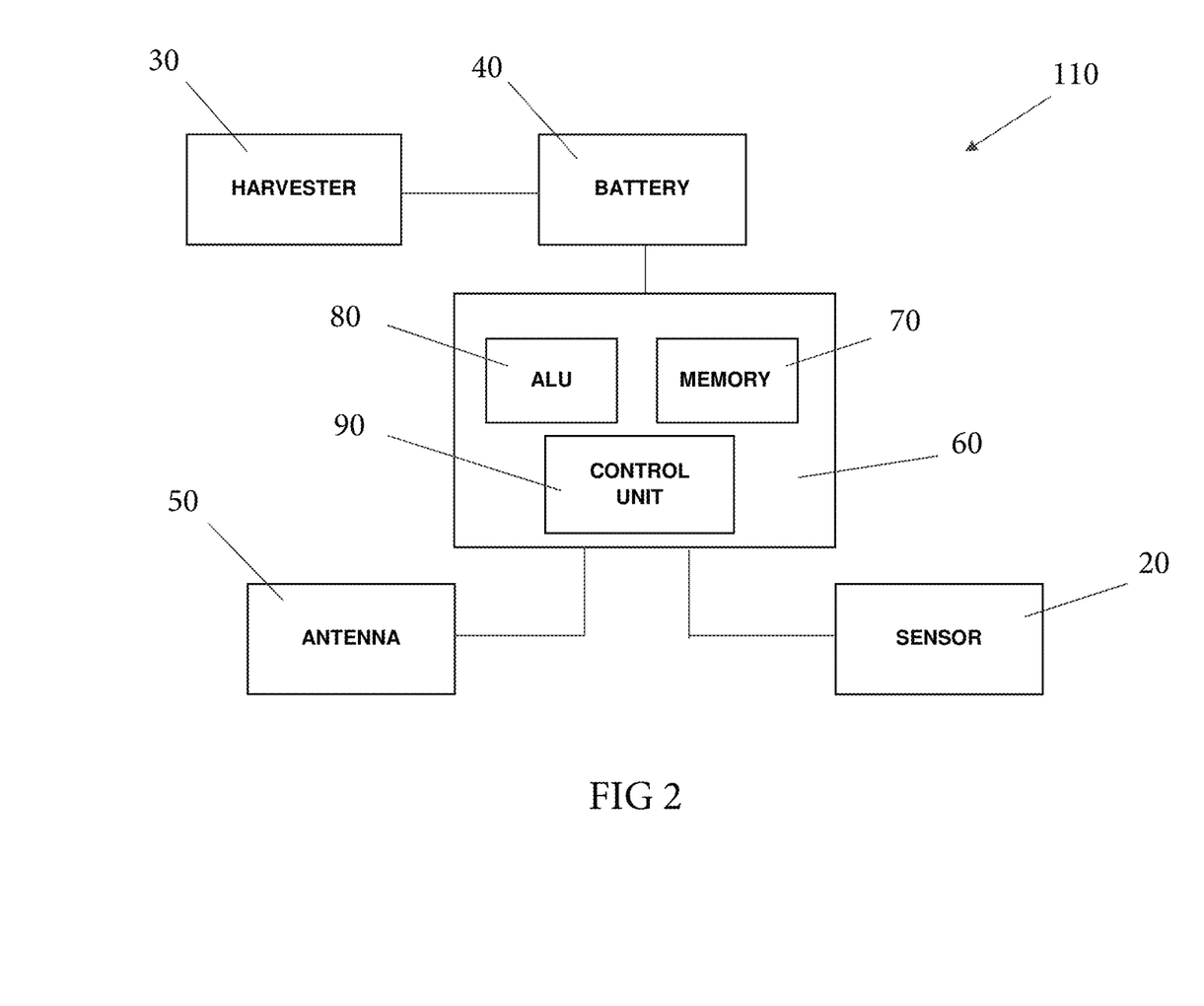
FIG. 2 is a schematic view of a system for managing sensor power to a remote wireless condition monitoring sensor on a railway according to the embodiment of FIG. 1.

Referring now to FIGS. 1 and 2, the system 110 provides an energy harvester 30 that derives wireless sensor power. The system 110 also provides a rechargeable battery 40 that is connected to the energy harvester 30. The energy harvester is configured to supply energy to the rechargeable battery 40 and for powering the system 100. The energy harvester 30 may provide being one of an electromagnetic 30, a piezoelectric 30, or a thermal energy harvester 30.

The system 110 further provides an antenna 50. The antenna 50 is provided for sending signals to a remote database based on measured vibration and acceleration data. In addition, the system 110 provides a central processing unit 60 having a memory 70, an arithmetic logic unit 80 and a control unit 90 for controlling a function of the system 100.

Figure 3:
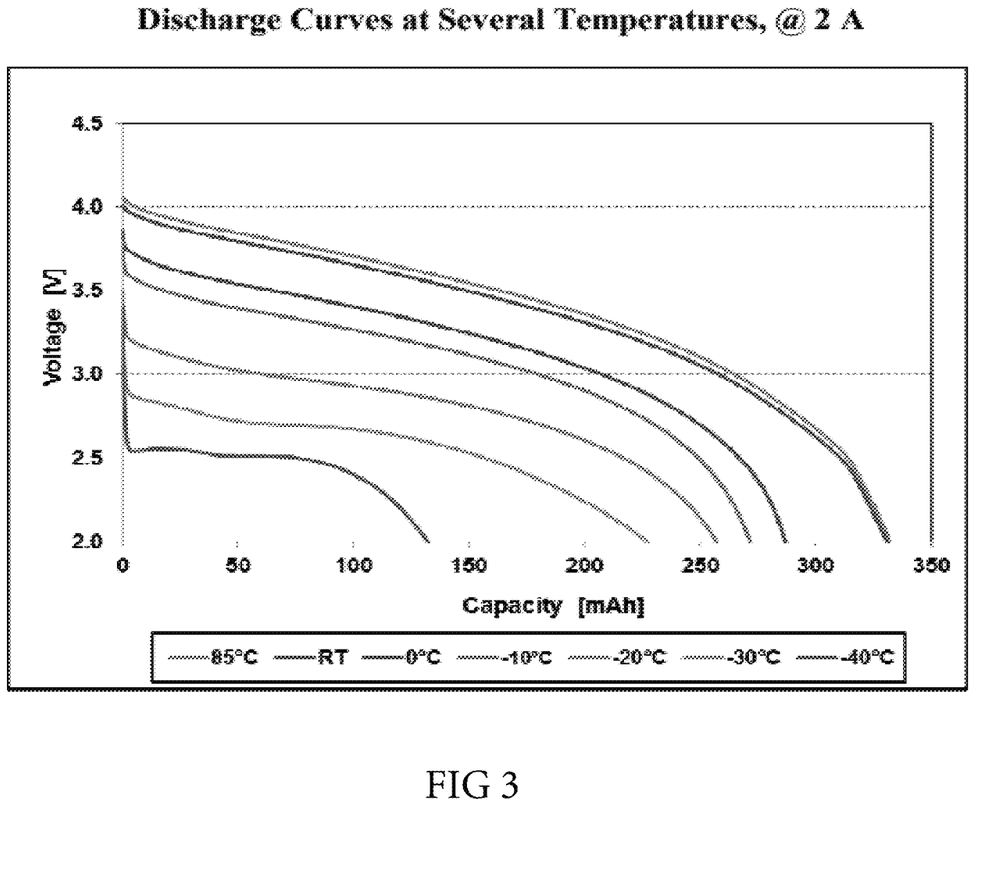
FIG. 3 shows a graph of discharge curves at several temperatures @ 2 A versus capacity in milliampere hours according to the embodiment of FIG. 1.

Energy capacity thresholds for the rechargeable battery 40 are configured in the memory 70. An available energy capacity is calculated by the arithmetic logic unit 80 based on a measured voltage and temperature of the rechargeable battery 40. FIG. 3 shows various battery discharge curves at several temperatures @ 2 A for Voltage [V] versus Capacity in [mAh]. These curves were obtained from a specification sheet from TADIRAN BATTERIES LTD for Lithium Ion Rechargeable Battery Model TLI-1550A. The specification information can be found on http://www.tadiranbat.com/assets/tli-1550a.pdf. As can be seen, as temperature increases, capacity drops off. Also, as voltage drops off, capacity decreases. The normal voltage operating range lies between 3-4V.

The system or remote condition monitoring device 110 is configured with at least five different power modes that are enterable based on the calculated available energy capacity of the internal rechargeable battery and/or specific events detailed.

Figure 4:
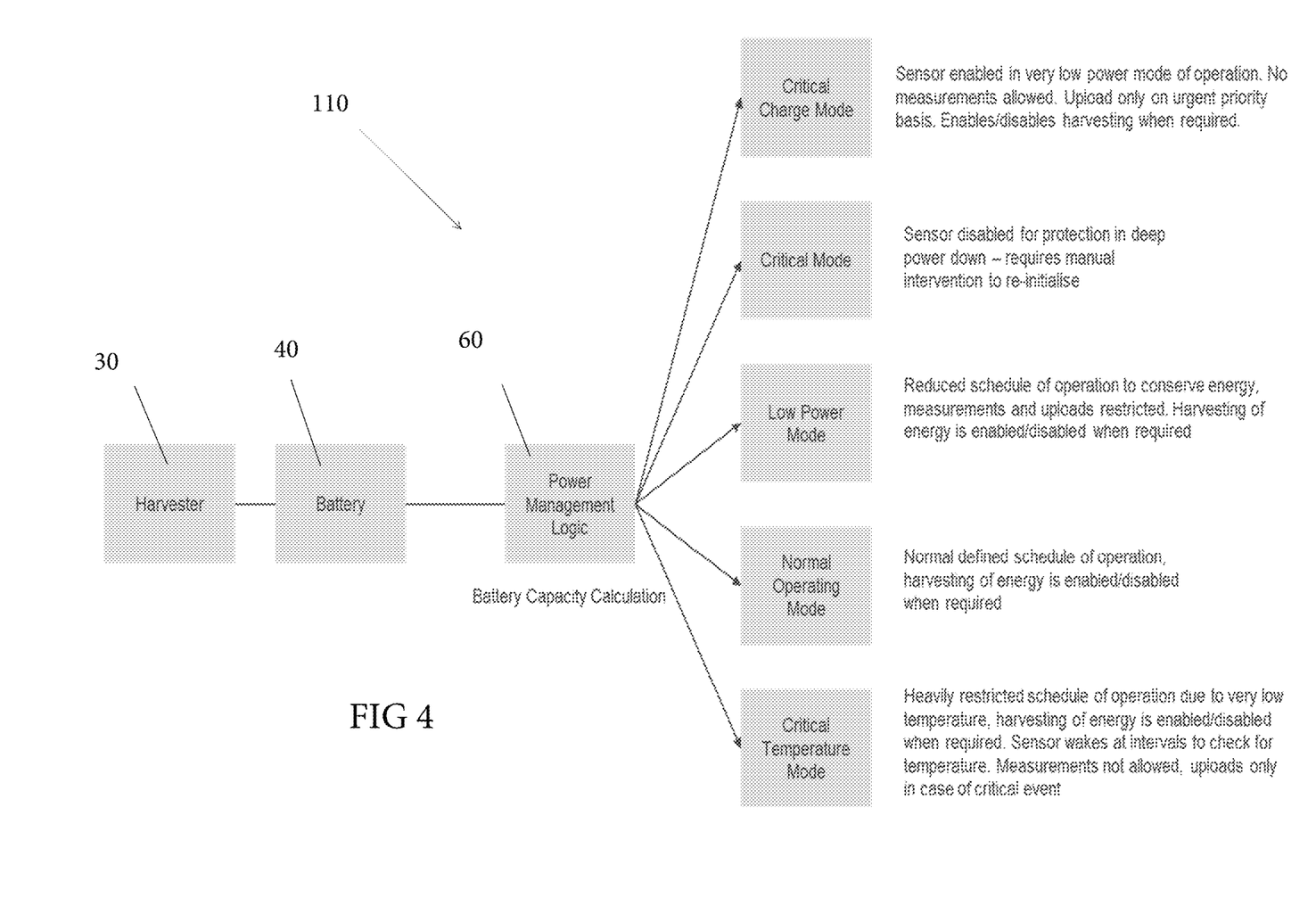
FIG. 4 shows a schematic view of the system and optional modes of the system according to the according to the embodiment of FIG. 1.

The at least five power modes that are enabled are based calculations from the central processing unit or power management logic. See FIG. 4. The five modes include a Critical Charge Mode, a Critical Mode, a Low Power Mode, a Normal Operating Mode and a Critical Temperature Mode and are described as such:

Critical Charge Mode—Here, the sensor is enabled in a very low power mode of operation. No measurements are allowed because it may draw too much power to do so. Sensor uploads are allowed only on an urgent priority basis. As such, harvesting is enabled/disabled only when required.

Figure 5A:
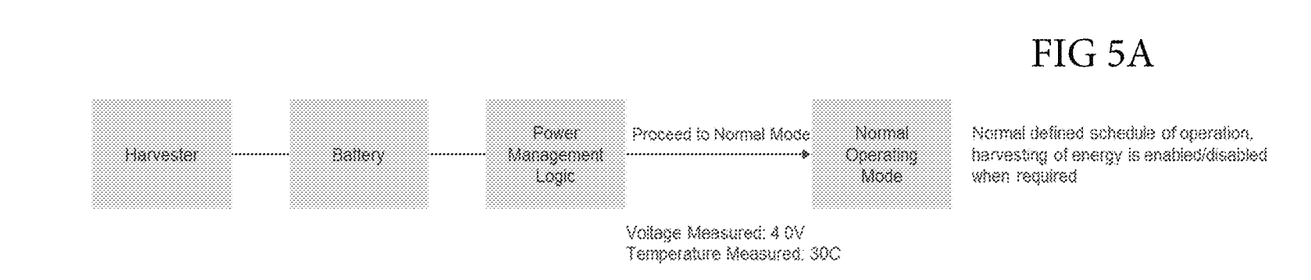
FIGS. 5A, 5B and 5C are each schematic views of an example of the normal mode, critical mode and critical temperature modes according to the according to the embodiment of FIG. 1.

Normal Operating Mode—Here, a normal schedule of operation defined. Harvesting of energy is enabled/disabled when required. See also FIG. 5A where the example provides a voltage measured of 4.0V and the temperature measured is 30 C. A battery capacity calculation yields 90%. As such, the normal mode of operation is enabled.

Figure 5B:
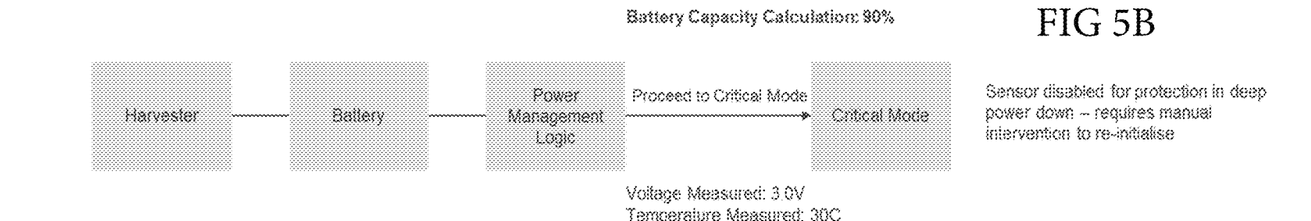

Critical Mode—Here, the sensor is disabled for protection in a deep power down mode. This requires manual intervention to re-initialize the system. See also FIG. 5B where the example provides a voltage measured of 3.0V and the temperature measured is 30 C. A battery capacity calculation yields 20%. As such, the critical mode of operation is only enabled.

Low Power Mode—Here, a reduced schedule of operation to conserve energy, measurements and uploads are restricted. Harvesting of energy is enabled/disabled only when required.

Figure 5C:
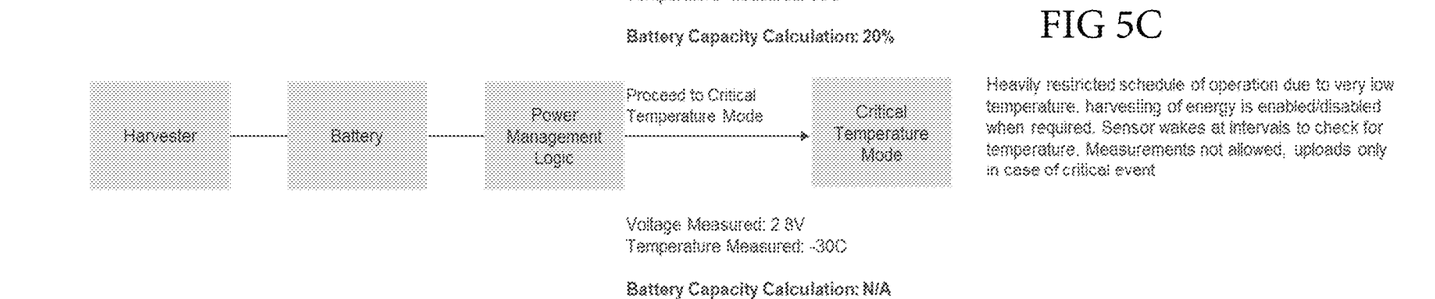

Critical temperature Mode—See also FIG. 5C where the example provides a voltage measured of 2.8V and the temperature measured is −30 C. A battery capacity calculation yields a result that is N/A. As such, the critical temperature mode of operation is only enabled.

Accordingly, the remote wireless condition monitoring sensor 20 is protected from potentially fatal over voltage and under voltage conditions and the operating life is prolonged by entering the above disclosed dedicated modes of operation based on battery voltage and available energy capacity as instructed by the central processing unit 90. Irreversible damage is avoided by insuring that the battery 40 is not discharged below a threshold level.

Method

A method 200 of managing sensor power to a remote wireless condition monitoring sensor installed on a railway rolling stock will now be described. See FIG. 6.

Figure 6:
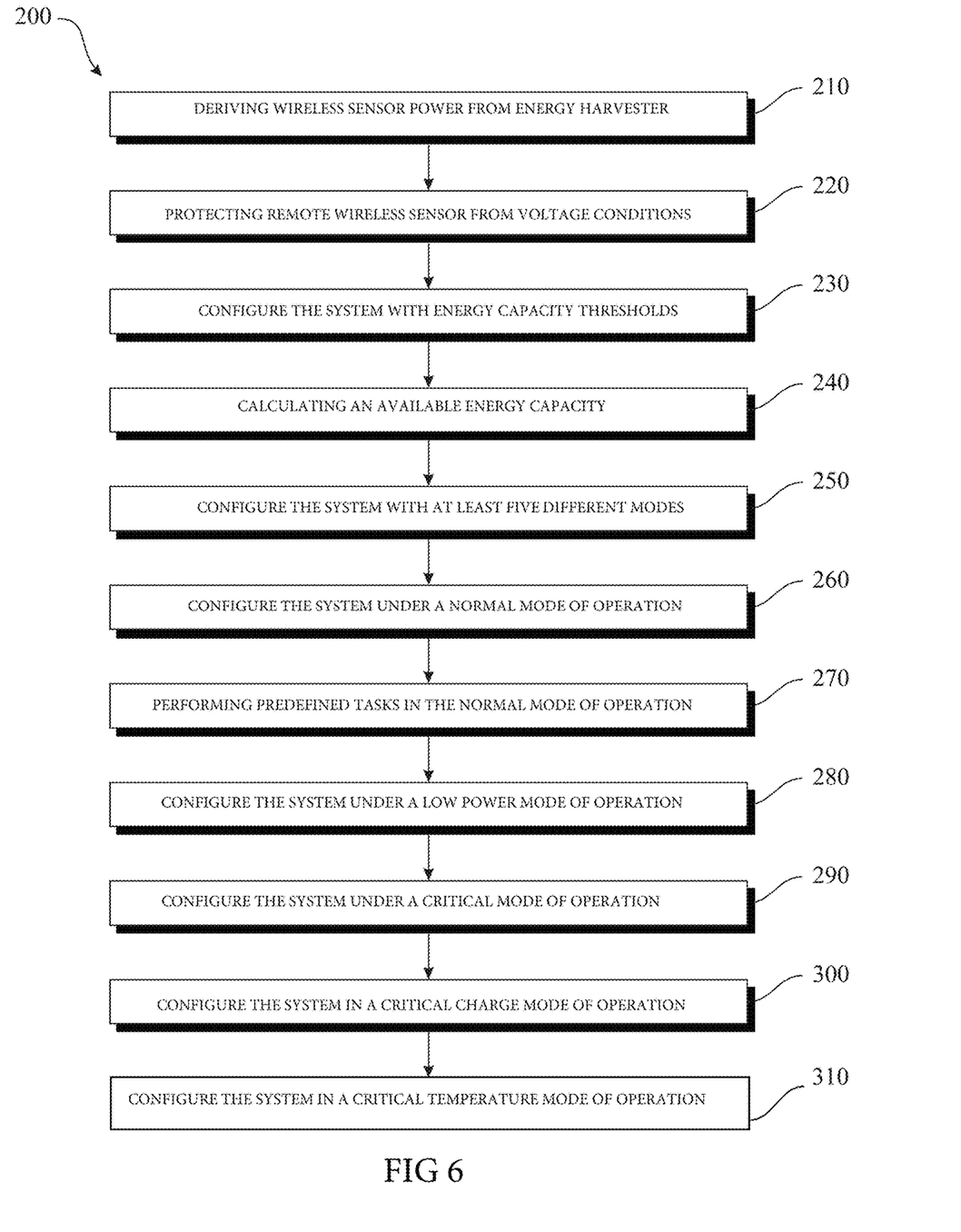
FIG. 6 is a list of steps undertaken to execute a method according to the according to the embodiment of FIG. 1.

In a first step 210 the method includes deriving wireless sensor power from an energy harvester supplying energy into a rechargeable battery.

In a second step 220 the method provides protecting the remote wireless condition monitoring sensor from potentially fatal over voltage and under voltage conditions and prolonging the operating life by entering dedicated modes of operation based on battery voltage and available energy capacity before damage occurs to the rechargeable battery.

In a third step 230 the method calls for configuring the system with energy capacity thresholds for the rechargeable battery.

Next, establishing/calculating an available energy capacity based on a measured voltage and temperature of the rechargeable battery in step 240.

It should be noted that incurring irreversible damage to the battery occurs if the battery is discharged below a critical level and if the battery is irreversibly damaged, the remote condition monitoring device will be unable to recover.

The method comprising a step 250 of configuring the remote condition monitoring device with at least five different power modes that are enterable based on a calculated available energy capacity of the internal rechargeable battery and/or specific events detailed.

The method comprising a step 260 of configuring the remote wireless condition monitoring sensor under a normal power mode of operation.

The method comprising a step 270 of performing pre-defined tasks in the normal power mode of operation by the remote wireless conditioning monitoring sensor enables the sensor to capture measurements, harvest power, upload data, measure the voltage and temperature of the battery. Operating in the normal mode of operation by the remote condition monitoring sensor is continued if the calculated available energy is greater than or equal to a normal operating mode threshold limit.

The method further comprising a step 280 of configuring the remote wireless condition monitoring sensor under a low power mode of operation. Here, detecting that the calculated available capacity is under a limit previously calculated configures the remote wireless condition monitoring sensor in the low power mode of operation. As such, reverting to the low power mode of operation reduces the operating schedule to conserve energy where measurements and data uploads are restricted to be performed less frequently by the remote wireless condition monitoring sensor.

The method also comprising a step 290 of configuring the remote wireless condition monitoring sensor in a critical mode of operation. Here, detecting that the energy available has breached a threshold and if no action is taken irreversible damage to the sensor occurs. Entering the critical mode of operation is based on no energy being harvested for a significant period of time. Deactivating power to all but a single circuit used solely to allow the sensor to be stored in an inactive state for prolonged periods and later recovered as a means of protection is instructed by the sensor. Reverting to a deep power down mode where only user intervention can re-initialise the device is instructed by the sensor. Enabling the sensor to survive for years is provided before reinitialising operation once again.

The method providing a step 300 of configuring the remote wireless condition monitoring sensor in a critical charge mode of operation. Here, after re-initialising the sensor, the energy available is still at a critical level. Exiting the critical mode is carried out by the sensor first harvesting power and then entering a mode of operation where only power is supplied to the harvesting power management circuit. Enabling configuration of the critical charge mode is provided until the energy capacity has been charged to a minimum threshold level. Reverting to the critical mode is provided if the sensor fails to harvest power within a defined period of time.

The method also providing a step 310 of configuring the remote wireless condition monitoring sensor in a critical temperature mode of operation. Reverting immediately to a critical temperature mode is provided if the sensor measures an extreme low temperature below a pre-defined threshold while in the normal operation or low power mode. At very low temperatures the capacity of the battery is low and insufficient for certain functions to be executed. In this mode, the sensor decreases its power usage from the battery even further and restricts measurements, data uploads and may also restrict harvesting. Here, the sensor is scheduled to wake at pre-defined intervals to check the temperature to see if it can exit the critical temperature mode.

Since many modifications, variations, and changes in detail can be made to the described preferred embodiments and methods of the invention, it is intended that all matters in the foregoing description and shown in the accompanying drawings be interpreted as illustrative and not in a limiting sense. Thus, the scope of the invention should be determined by the appended claims and their legal equivalence.

The invention claimed is:

1. A system for managing sensor power to a remote wireless condition monitoring sensor installed on a railway rolling stock, the system comprising:
an energy harvester that derives the sensor power,
a rechargeable battery connected to the energy harvester for supplying energy to the rechargeable battery and for powering the system,
an antenna for sending signals to a remote database based on a measured vibration and acceleration data,
a central processing unit having a memory, an arithmetic logic unit and a control unit for controlling a function of the system, wherein
the remote wireless condition monitoring sensor is protected from an over voltage condition and an under voltage condition and an operating life is prolonged by entering dedicated modes of operation based on a battery voltage and an available energy capacity as instructed by the central processing unit,
energy capacity thresholds for the rechargeable battery are configured in the memory, and
the available energy capacity is calculated by the arithmetic logic unit based on a measured voltage and a temperature of the rechargeable battery, wherein
the remote condition monitoring device is configured with at least five different power modes that are enterable based on the calculated available energy capacity of an internal rechargeable battery and/or specific events detailed, wherein
an irreversible damage is avoided by insuring that the battery is not discharged below a threshold level.

2. The system for managing the sensor power to the remote wireless condition monitoring sensor installed on a railway rolling stock according to claim 1, wherein the energy harvester is one of an electromagnetic, a piezoelectric, and a thermal energy harvester.

3. A method of managing sensor power to a remote wireless condition monitoring sensor installed on a railway rolling stock, the method comprising:
deriving the sensor power from an energy harvester supplying energy into a rechargeable battery,
protecting the remote wireless condition monitoring sensor from an over voltage condition and an under voltage condition and prolonging an operating life by entering dedicated modes of operation based on a battery voltage and an available energy capacity before damage occurs to the rechargeable battery,
configuring the system with energy capacity thresholds for the rechargeable battery, and
establishing the available energy capacity based on a measured voltage and a temperature of the rechargeable battery, wherein
incurring an irreversible damage to the battery occurs if the battery is discharged below a critical level, and wherein
if the battery is irreversibly damaged, the remote condition monitoring device will be unable to recover.

4. The method of managing the sensor power to the remote wireless condition monitoring sensor installed on a railway rolling stock according to claim 3, the method further comprising:
configuring the remote condition monitoring device with at least five different power modes that are enterable based on a calculated available energy capacity of an internal rechargeable battery and/or specific events detailed.

5. The method of managing the sensor power to the remote wireless condition monitoring sensor installed on a railway rolling stock according to claim 4, the method further comprising:
configuring the remote wireless condition monitoring sensor under a normal power mode of operation, wherein
performing pre-defined tasks in the normal power mode of operation by the remote wireless conditioning monitoring sensor enables the sensor to capture measurements, harvest power, upload data, measure the voltage and the temperature of the battery, and wherein
operating in the normal mode of operation by the remote condition monitoring sensor is continued if the calculated available energy is greater than or equal to a normal operating mode threshold limit.

6. The method of managing the sensor power to the remote wireless condition monitoring sensor installed on a railway rolling stock according to claim 4, the method further comprising:
configuring the remote wireless condition monitoring sensor under a low power mode of operation, wherein
detecting that the calculated available capacity is under a limit previously calculated configures the remote wireless condition monitoring sensor in the low power mode of operation, and wherein
reverting to the low power mode of operation reduces an operating schedule to conserve energy where measurements and data uploads are restricted to be performed less frequently by the remote wireless condition monitoring sensor.

7. The method of managing the sensor power to the remote wireless condition monitoring sensor installed on a railway rolling stock according to claim 4, the method further comprising:
configuring the remote wireless condition monitoring sensor in a critical mode of operation, wherein
detecting that the energy available has breached a threshold and if no action is taken irreversible damage to the sensor occurs, wherein
entering the critical mode of operation is based on no energy being harvested for a significant period of time, wherein
deactivating power to all but a single circuit used solely to allow the sensor to be stored in an inactive state for prolonged periods and later recovered as a means of protection is instructed by the sensor, and
reverting to a deep power down mode where only user intervention can re-initialize the device is instructed by the sensor, and wherein
enabling the sensor to survive for years is provided before reinitializing the operation once again.

8. The method of managing the sensor power to the remote wireless condition monitoring sensor installed on a railway rolling stock according to claim 4, the method further comprising:
configuring the remote wireless condition monitoring sensor in a critical charge mode of operation, wherein
after re-initializing the sensor, the energy available is still at a critical level, wherein
exiting the critical mode is carried out by the sensor of a first harvesting power and then entering a mode of operation where only power is supplied to a harvesting power management circuit, wherein enabling configuration of the critical charge mode is provided until the energy capacity has been charged to a minimum threshold level, and wherein reverting to the critical mode is provided if the sensor fails to harvest the power within a defined period of time.

9. The method of managing the sensor power to the remote wireless condition monitoring sensor installed on a railway rolling stock according to claim 4, the method further comprising:

configuring the remote wireless condition monitoring sensor in a critical temperature mode of operation, wherein reverting immediately to the critical temperature mode is provided if the sensor measures an extreme low temperature below a pre-defined threshold while in a normal operation or a low power mode, wherein at very low temperatures the capacity of the battery is low and insufficient for certain functions to be executed, wherein in the critical temperature mode, the sensor decreases the power usage from the battery even further and restricts measurements, data uploads and may also restrict harvesting, and wherein the sensor is scheduled to wake at pre-defined intervals to check the temperature to see if it can exit the critical temperature mode.

10. The method of managing the sensor power to the remote wireless condition monitoring sensor installed on a railway rolling stock according to claim 3, the method further comprising providing one of an electromagnetic energy harvester, a piezoelectric harvester, and a thermal energy harvester.

\* \* \* \* \*